UNITED STATES PATENT OFFICE.

RICHARD HOGAN, OF LOCHGELLY, SCOTLAND.

COMPOUND FOR TREATING GLASS SURFACES.

No. 865,589.

Specification of Letters Patent.

Patented Sept. 10, 1907.

Application filed January 8, 1907. Serial No. 351,327.

*To all whom it may concern:*

Be it known that I, RICHARD HOGAN, a subject of the King of Great Britain, residing at Lochgelly, Fife, Scotland, have invented a new and useful Improvement in Compounds for Glass Surfaces, of which the following is a specification.

This invention relates to a compound, the object of which is to prevent the condensation of moisture upon glass surfaces.

The compound will be found especially serviceable when applied to mirrors, to windows of engine cabs, and to other surfaces of glass where the condensation of moisture is always objectionable, and sometimes a serious matter.

The compound consists of two parts of common candle wax to one part of pure glycerin. These ingredients are mixed in the following manner:—The candle wax is reduced to a liquid state and the required portion of glycerin is poured upon a metal tray which is previously warmed to prevent a too rapid solidification of the wax. The liquefied wax is then poured upon the glycerin in the tray and is rapidly and thoroughly mixed therewith. As soon as the mixture begins to set or harden it is placed in suitable molds and molded into any shape which it may be found convenient to employ.

The candle wax employed by me is a compound of pure bees wax with any suitable vegetable wax, such as Japan wax, with a small proportion of hard paraffin. The analysis of one of the candle waxes I have used shows that it contains seventy-five percent of pure bees wax and approximately twenty-five percent of vegetable waxes, the proportion of paraffin being practically negligible. In these candle waxes seventy-five percent of bees wax is guaranteed but very often the real percentage of bees wax will run as high as eighty-five or ninety percent.

The cakes or blocks into which the compound is molded may of course, be of various sizes and shapes according to the use to which it is to be placed.

The above proportions are the preferred ones but it will be obvious that a slight variation in the proportions can be permitted without destroying the value of the compound for the use above mentioned.

The glass surface to be treated should be cleaned and dried, and the composition is rubbed slightly over this surface. The glass is then rubbed briskly with a slightly warm cloth until all traces of the composition disappear. The glass will then take on a highly polished aspect and the condensation of moisture upon the surfaces so treated is effectively guarded against. Mirrors so treated have after the treatment above described, been washed with warm water and soap and dried and have then been breathed upon and no trace of moisture left upon the surface, so that the effect of the compound, upon a glass surface is not destroyed by subsequent washing of the surface to remove dirt.

Having thus fully described my invention, what I claim as new and desire to secure by Letters Patent, is:—

A compound for treating glass surfaces consisting of two parts of a waxy material, and one part of glycerin.

RICHARD HOGAN.

Witnesses:
GEORGE COBB,
FREDERICK PIATT.